US008849722B2

(12) United States Patent
Fijnvandraat

(10) Patent No.: US 8,849,722 B2
(45) Date of Patent: Sep. 30, 2014

(54) SETTING AND CONTROLLING AN APPARATUS FOR PREPARING MAIL PIECES

(75) Inventor: Hendrik Cornelis Fijnvandraat, Enschede (NL)

(73) Assignee: Neopost Technologies, Bagneux (FR)

( * ) Notice: Subject to any disclaimer, the term of this patent is extended or adjusted under 35 U.S.C. 154(b) by 814 days.

(21) Appl. No.: 12/560,013

(22) Filed: Sep. 15, 2009

(65) Prior Publication Data

US 2011/0066573 A1 Mar. 17, 2011

(30) Foreign Application Priority Data

Sep. 15, 2008 (EP) .................................... 08164330

(51) Int. Cl.
*G06Q 30/00* (2012.01)
*G07B 17/00* (2006.01)
*G06Q 10/00* (2012.01)

(52) U.S. Cl.
CPC *G07B 17/00467* (2013.01); *G07B 2017/00491* (2013.01)
USPC ............................................ 705/330; 705/1.1

(58) Field of Classification Search
USPC .................................. 705/1.1, 330–344, 401
See application file for complete search history.

(56) References Cited

U.S. PATENT DOCUMENTS

| | | | | |
|---|---|---|---|---|
| 4,800,505 | A | 1/1989 | Axelrod et al. | |
| 5,283,752 | A | 2/1994 | Gombault et al. | |
| 6,182,090 | B1 * | 1/2001 | Peairs | 715/209 |
| 2005/0231746 | A1 * | 10/2005 | Parry et al. | 358/1.13 |
| 2007/0176356 | A1 | 8/2007 | Welch et al. | |
| 2007/0179665 | A1 * | 8/2007 | Welch et al. | 700/220 |

FOREIGN PATENT DOCUMENTS

| | | | |
|---|---|---|---|
| EP | 1 347 372 | A1 | 9/2003 |
| EP | 1 953 703 | A1 | 8/2008 |
| WO | 98/24563 | A1 | 6/1998 |
| WO | 2005/029392 | A1 | 3/2005 |

* cited by examiner

*Primary Examiner* — George Chen
(74) *Attorney, Agent, or Firm* — Sughrue Mion, PLLC

(57) ABSTRACT

During a setting stage, a scanner of an apparatus for preparing mail pieces scans a postal item. From the scanned image an area containing a mark is selected and a mark data set representing the mark or the position of the selected area is generated and stored. Instruction data representing a mail preparation instruction are stored in association with the mark data set. During an operating stage after the setting stage, one or more postal items are fed to the scanner, which scans item image data representing an image of the scanned portion of each postal item that is scanned. In response to agreement between the scanned item image data and the mark data set, instruction data associated to the mark data are selected. The mail piece including the scanned postal item is prepared in accordance with the selected instruction data.

6 Claims, 3 Drawing Sheets

SETTING AND CONTROLLING AN APPARATUS FOR PREPARING MAIL PIECES

FIELD AND BACKGROUND OF THE INVENTION

The invention relates to a method for setting and controlling an apparatus for preparing mail pieces.

Many apparatuses for preparing items to be mailed are capable of processing postal items into mail pieces in accordance with instructions read from the mail pieces. The instructions may for instance relate to the selective feeding of inserts to be added to some of the main document documents only, to indicate which ones of personalized documents belong to the same mail piece or to indicate whether an envelope is to be closed or not. Such instructions are typically provided on the postal items in the form of standardized optical mark reading (OMR) codes. The addition of OMR codes typically requires special software for which the implementation needs to be co-ordinated and only postal items carrying OMR codes according to a particular standard can be processed.

It is also known to program apparatuses for preparing mail pieces to operate in accordance with marks according to different standards, but this is usually quite cumbersome.

From U.S. Pat. No. 4,800,505, it is known to provide markings on documents that refer to a set of instructions associated to the respective individual document stored in a memory. The printing of such markings also requires special software and moreover needs to be co-ordinated with storing associated instructions in a memory and making available the instructions at the time of processing of the individual printed documents.

From U.S. Pat. No. 5,283,752, it is known to output instructions for controlling a printer and a mail preparation stations, to feed the main postal; items directly from the printer to the mail preparation stations and to supply the instructions for controlling the mail preparation stations in accordance with the printing of the main postal items. Thus, the printing of markings for the processing of the postal items can be omitted completely. However, special software is required for generating the instructions to be outputted for the mail preparation stations and reliability of the synchronization between the supply of instructions and postal items is critical for reliable processing of the postal items.

In U.S. patent application 2007/0176356, it is disclosed to designate a region in a displayed image of a mailpiece to be printed or of a template for mailpieces to be printed as the region containing information to which expressions for performing certain operations may be related in accordance with rules defined, created or modified using a rules editor. In operation, the commands/expressions are processed by a rules engine and converted to an appropriate OMR or Barcode mark by an assembly/scan code generator. A disadvantage of this method is that access to digital data in a suitable format representing the documents to be printed is required, that room must be available to print the marks and that the marks disturb the visual quality of the document.

SUMMARY OF THE INVENTION

It is an object of the present invention to provide a user-friendly solution which allows selective processing of preprinted postal items with a high degree of flexibility and without having to resort to predetermined standardized marks provided on the postal items specifically for the selective processing of the postal items into mail pieces.

According to the invention, this object is achieved by providing a method for setting and controlling an apparatus for preparing mail pieces, the method including a setting stage and at least one subsequent operating stage during which the apparatus prepares mail pieces in accordance with settings established during the setting stage, the setting stage including:

a scanner of the apparatus scanning at least a portion of the postal item;

storing image data representing an image of the scanned portion of the postal item;

displaying the image represented by the image data on a display, the displayed image containing a mark;

selecting an area of the displayed image containing the mark;

generating, from the image data representing the selected area of the displayed image, a mark data set representing at least the mark;

storing the mark data set;

inputting instruction data representing at least one mail preparation instruction; and storing the inputted instruction data in association with the mark data set; and the operating stage including:

feeding at least one postal item for inclusion in a mail piece to the scanner;

the scanner scanning item image data representing an image of the scanned portion of the postal item;

comparing the scanned item image data with the mark data set;

in response to agreement between the scanned item image data and the mark data set, selecting instruction data stored in association to the mark data set from the inputted instruction data; and the apparatus preparing the mail piece including the scanned postal item in accordance with the selected instruction data.

The invention can also be embodied in an apparatus for preparing mail pieces, including at least one station for processing a postal item into a mail piece, a scanner and a control system connected to the scanner and the at least one station; the control system including a memory and a data processor and being arranged for operating in a setting mode and in an operating mode during which the apparatus prepares mail pieces in accordance with settings established during the setting mode, operation in the setting mode including:

causing the scanner of the apparatus to scan at least a portion of the postal item;

storing image data received from the scanner and representing an image of the scanned portion of the postal item;

causing the image represented by the image data to be displayed on a display, the displayed image containing a mark;

storing a user input selecting an area of the displayed image;

generating, from image data representing the selected area of the displayed image, a mark data set representing at least the mark;

storing the mark data set; and storing user inputted instruction data representing at least one mail preparation instruction in association with the mark data set; and operation in the operating mode including:

causing at least one postal item for inclusion in a mail piece to be fed to the scanner;

causing the scanner to scan item image data representing an image of the scanned portion of the fed postal item;

comparing the scanned item image data with the mark data set;

in response to agreement between the scanned item image data and the mark data set, selecting instruction data stored in association to the mark data set from the inputted instruction data; and causing the apparatus to prepare the mail piece including the scanned postal item in accordance with the selected instruction data.

By associating instructions to data representing a selected area of an image scanned from a document, any mark or combination of marks on a printed document can easily be specified, without access to digital data, as indicating that, if that mark or such a mark is scanned from a document, particular processing steps are required for the documents from which the mark has been scanned.

Particular elaborations and embodiments of the invention are set forth in the dependent claims.

Further features, effects and details of the invention appear from the detailed description and the drawings.

DETAILED DESCRIPTION

Figure 1:
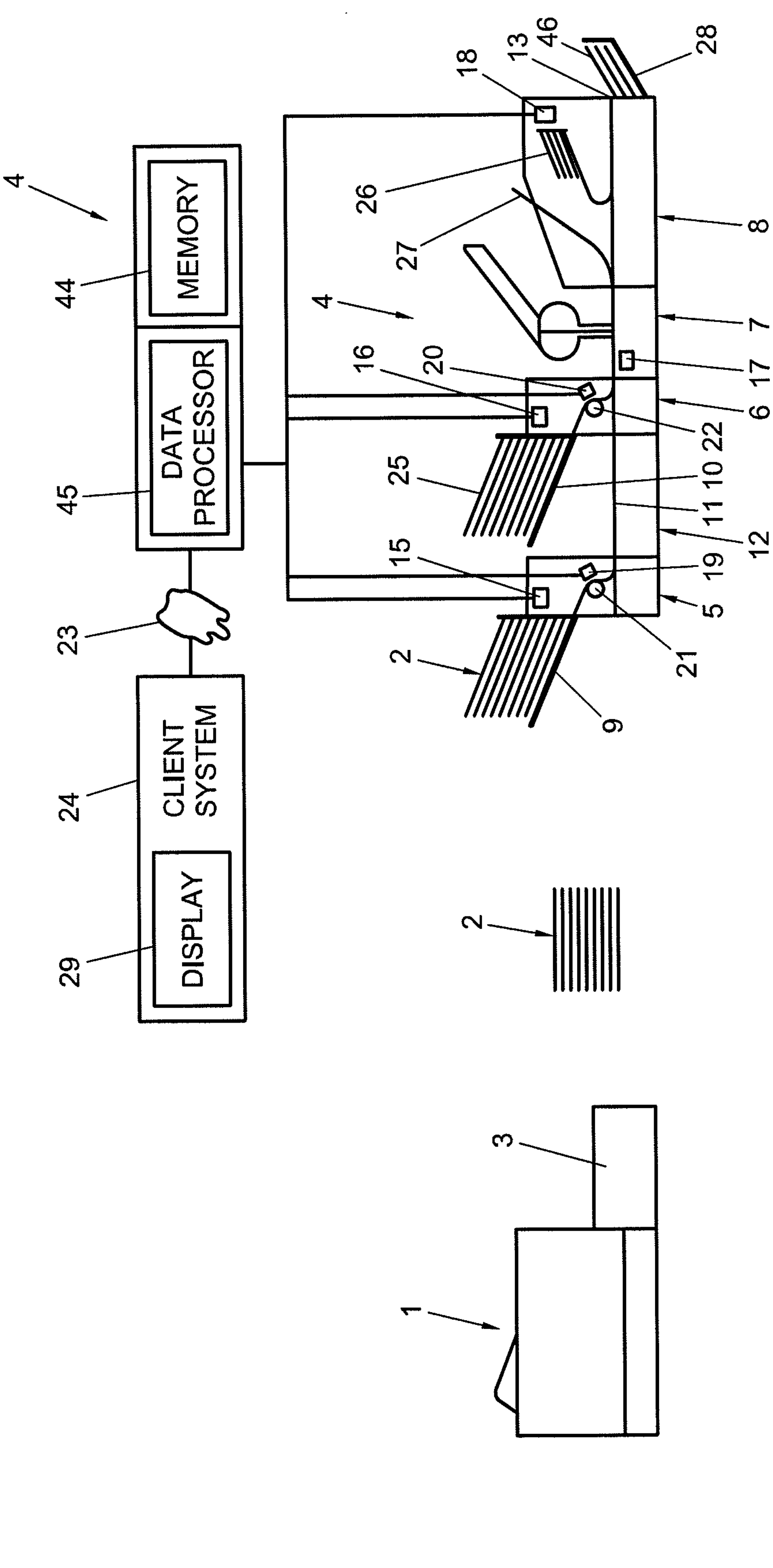
FIG. 1 is a schematic representation of a process for preparing mail pieces.

FIG. 1 illustrates an example of the preparation of mail pieces. A printer 1 prints a stack of postal items 2 in the form of main documents. The printed documents are initially collected in a storage 3 of the printer 1 and then transported as a stack from the printer 1 to an apparatus 4 for preparing mail pieces 46 from printed postal items 2, 25.

According to the present example, the apparatus 4 for preparing mail pieces 46 is composed of two feeding stations 5, 6, a folding station 7 and an inserting station 8. Other types and numbers of stations can be provided. The feeding stations each have a hopper 9, 10 for receiving postal items to be fed to a transport track 11 defined by transport rollers and guides of the stations 5-8 and of a transport unit 12 to which the two feeding stations 5, 6 are mounted, which transport track 11 extends through the apparatus 4 from the feeding station 5 to an exit 13 of the inserting station 8.

For controlling the stations 5-8, a control system 14 is provided which is connected to distributed control units 15-18 of the stations 5-8 and to scanners 19, 20 of the feeding stations 5, 6. The control system 14 includes a memory 44 and a data processor 45. The scanners 19, 20 are each provided in the form of an array of light sensitive elements and arranged to generate a graphic image from successively scanned lines in association with displacement of a postal item passed along the scanner 19, 20 in accordance with incremental rotation of rollers 21 and, respectively, 22. The rollers 21, 22 may be coupled to a sensor such as a pulse disk to sense the displacements or to a motor to control the displacements.

The control system 14 is connected to a network 23 to which a client system 24 equipped with a display 29 is connected. The client system 24 can be used as a user interface to input settings into the control system 14 and to display images on the display 29 in response to commands and image data received from the control system 14. It is however also possible to provide the user interface as part of the apparatus 4, so that it can operate fully stand-alone.

During preparation of mail pieces, a stack of printed postal items 3 is placed in a hopper 5 of the first feeding station 5 and another stack 25 of inserts may be placed in the hopper 10 of the second feeding station 6. The first feeding station 5 feeds documents to the transport track and the second feeding station 6 feeds inserts so that the inserts are each added to a document or a set of documents fed from the first feeding station 5. Each set of documents and inserts is subsequently displaced along the transport track 11 towards the folding station 7 where the set of one or more documents and one or more inserts is folded in accordance with a setting of the folding station 7. Finally, the folded set is displaced along the transport track 11 to the inserting station 8 where the set is inserted into an envelope fed from a stack of envelopes 26. Sets that are not to be inserted can be diverted into a divert 27. After insertion of the set into an envelope is completed and the envelope is closed and sealed, the completed mail piece is discharged from an exit 13 into a mail piece holder 28.

In many cases, it is desired to control various processing in accordance with instructions that may differ from postal item to postal item. For instance the number of documents from stack 2 to be gathered into a set, whether or not an insert is to be added by the second feeder 6 and, if yes, how many, may be different for different sets of documents. Also how a set is folded and whether it is to be diverted can vary from set to set. In mail preparation apparatuses with more options, sets may be inserted in envelopes from different stacks in accordance with the size of the set or for instance the type of mailing.

The settings of the apparatus 4 for selective processing of postal items in accordance with indications present on the postal items can be inputted during a setting stage preceding one or more operating stages during which the apparatus prepares mail pieces in accordance with the settings established during the setting stage.

During the setting stage, one or more postal items is fed to one or more of the scanners 19, 20 of the apparatus, the scanners 19, 20 may each scan at least a portion of the postal item passed along the respective scanner. While other combinations are possible, for illustrative purposes it is assumed in the present example, that, during the setting stage, one document is fed from the hopper 9 along the scanner 19 and no document is fed along the scanner 20.

Figure 2:
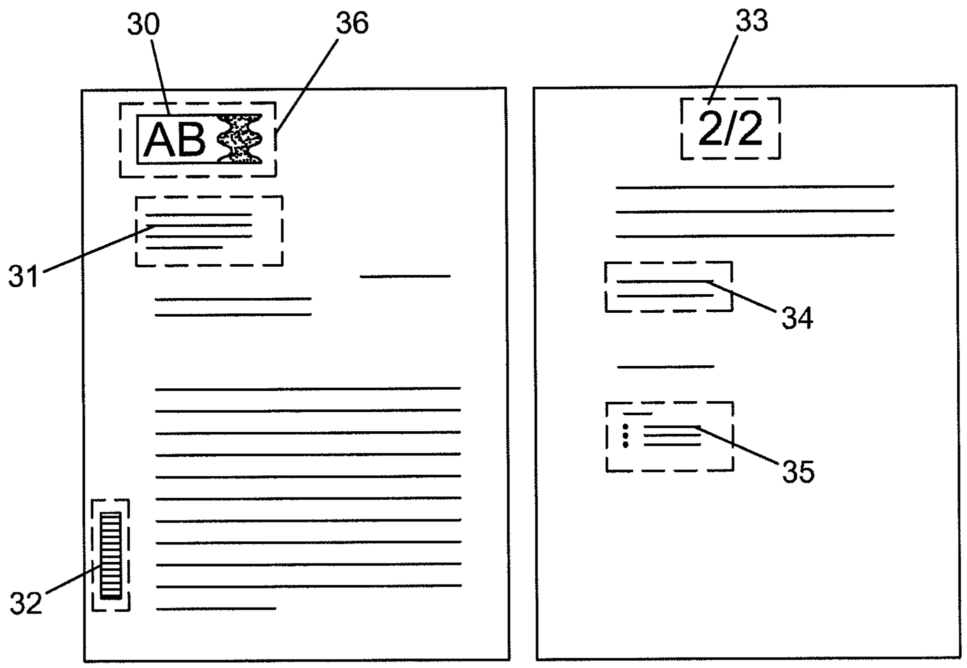
FIG. 2 is a schematic representation of an example of a scanned two page document as displayed.

The scanner 19 generates image data representing an image of the scanned portion of the postal item (see FIG. 2). The image represented by the image data is displayed on the display 29. According to the present example, the displayed image contains several marks that can be used for controlling the preparation of mail pieces, such as:

- a logo 30 that indicates that a postal item carrying that logo constitutes the first page of a main document and that identifies the sender of the document;
- an address 31 that contains information identifying the addressee and the destination of the postal item;
- a bar code 32 that may contain various kinds of information;
- a page numbering 33 that indicates the number of pages of a main document and the number of the scanned page;
- a salutation 34 which indicates that the postal item carrying that salutation is the last page of a set of main documents; and
- a listing of enclosures 35 which indicates which enclosures are to be sent with the document.

Use of many other indications that are commonly present in documents for controlling mail preparation in accordance with instructions varying between successive postal items is readily conceivable. Moreover, it is also advantageous if use of conventional mail preparation control marks, such as OMR marks and barcodes can be selected in an easy manner without having to resort to manufacturer specific data indicating the instructions intended to be associated to the marks.

To easily associate instructions to such indications, an area of the displayed image containing a mark to be used can be selected, for instance in a simple manner using a pointer control device (such as a "mouse") as generally known in graphic user interfaces, by highlighting an area containing that mark, for instance an area 36 containing the logo 30. In the present example, the selected area containing the mark is a rectangle, but other shapes of selected areas are conceivable as well, including an outline drawn closely along the contour of a mark. It is also possible to cause an area to be selected by marking the area on the document to be scanned, for instance using a particular color or line pattern.

In response to the selection of the area 36, mark data representing at least the mark 30 are generated from the image data representing the selected area of the displayed image.

Figure 3:
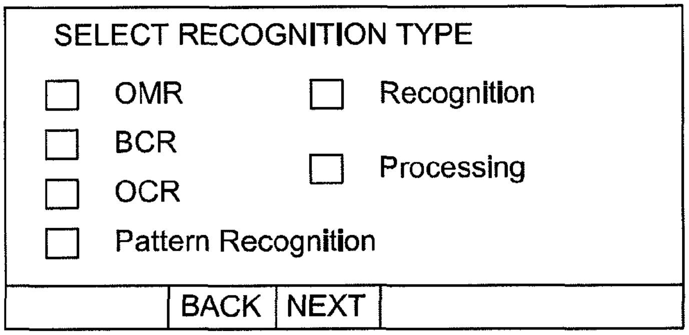
FIGS. 3-5 are example of screens of a graphic user interface for setting the apparatus for preparing mail pieces.
Figure 4:
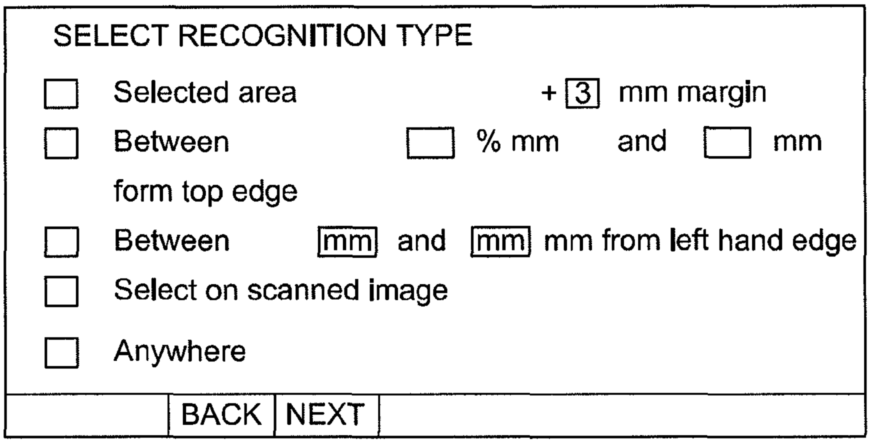
Figure 5:
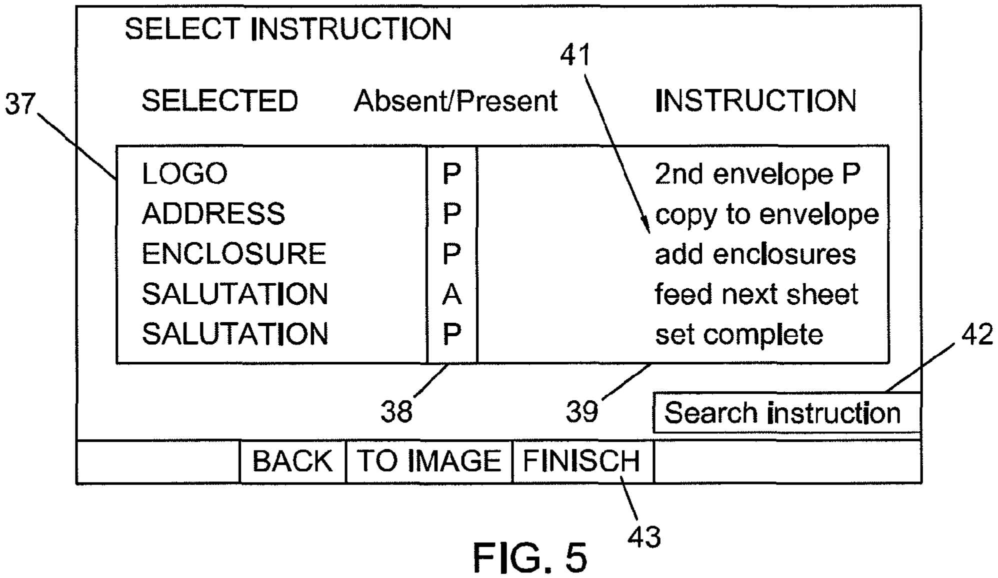

For easily inputting instruction data representing a mail preparation instruction regarding preparation of a mail piece, next a sequence of user interface screens shown in FIGS. 3-5 is shown.

First, a screen requesting the user to select a recognition type for recognizing the selected logo (FIG. 3) is displayed, which allows the user to choose between OMR (Optical Mark Reading), BCR (Bar Code Reading), OCR (Optical Character Recognition) and Pattern Recognition. Since the present logo 30 includes graphic elements to be recognized, pattern recognition is selected. The selection between "Recognition" and "Processing" allows to choose between recognizing of a marking or data represented thereby matching the selected marking or the value represented by the selected marking and, respectively, processing data represented by the marking scanned during processing, for example for printing an address scanned from a document on an envelope.

Next, a screen requesting the user to select a possible location of the selected logo (FIG. 4) is displayed, which allows the user to select whether the logo must be present in a predetermined position or not. The more narrowly the position is predetermined, the faster comparison of scanned postal items with selected marks can be carried out during operation. For the logo 30, the address 31, the bar code 32 and the page number 33, generally selecting the location of the selected area with a margin to accommodate for printing tolerances will generally be most advantageous. However, for a salutation 34 and a listing of enclosures, it will generally be preferable to specify a distance range from a side edge of the document as the zone in which the markings are to be found. In some cases specifying a zone parallel to the upper and lower end of the document, specifying a searching area on the image or leaving the possible position of the marking completely open can be more advantageous.

Next, a screen requesting the user to associate one or more instructions to the selected logo (FIG. 5) is displayed. On the screen, three columns are displayed. The left-hand column 37 contains a listing of selected markings, indicated by a name initially given by the control system 14, but editable by the user. In response to double-clicking a name, the control system 14 displays an image representing the associated mark data. The second column 38 indicates whether an instruction needs to be present or absent for the instruction in the fourth column 39 to be applicable. This value can be toggled by the user between absent and present.

In the present example, the presence of the logo 30 indicates that an envelope on which an address is to be printed is to be fed for inserting the document, the scanned address 31 is to be processed using OCR and the obtained character codes of a character encoding scheme such as ASCII or UTF-8 are to be reproduced by printing the characters on the envelope. It is also possible to reprint an image of the scanned address area on the envelope.

If a heading "Enclosure" is recognized, an insert is fed from the insert feeder 6 so that it is added to the main documents from which the wording "Enclosure" was read (instruction 41). If a text fragment matching the text fragment associated to the marking "Salutation" is not recognized, a next sheet is fed by the first feeder 5 and if a text fragment matching the text fragment associated to the marking "Salutation" is recognized, the gathered set of documents is displaced to the second feeding station 6.

Instructions to be associated to a selected marking can be entered by selecting from a listing which is displayed after having selected the "search instruction" button 42.

While inputting the instructions using an interactive "wizard type" user interface is user-friendly for relatively inexperienced users, for users familiar with the code standard for inputting settings, it may be preferable to directly input code representing a setting to be associated to the selected mark.

After a "finish" button is selected, the inputted instruction data are stored in the memory 44 of the control system 14 in association with the respective mark data.

During the operating stage one or more postal item is fed from the hopper of the first feeding station 5 for inclusion in a mail piece, item image data representing a pattern of brightnesses or colors scanned from the postal item or items and compared with the mark data stored in the memory 44. In response to the item image data or a portion thereof matching the mark data, the preparation of the mail piece including the scanned postal item is carried out in accordance with the inputted instruction data stored in association with the compared mark data, under control of the data processor 45.

In order to allow processing of postal items fully independently of the system with which the printings on the postal items has been generated, it is preferred that the generation of the image on the display of which at least a portion represents a mark is carried out by scanning of a specimen of a postal item such that the scanning data represent at least a pattern of at least brightnesses or colors scanned from the specimen. Determination of applicable combinations of marks and instructions to be carried out in response during the setting stage can be carried out particularly quickly if a special document is composed and printed which contains all the marks associated to instructions for preparing a postal item that occur in a job of mail pieces to be produced. Thus, the need of separately scanning several documents until all relevant marks have been scanned is obviated.

As is apparent from the example described above, from the image data, a character code referring to a character of a character set or repertoire may be determined, the mark data set representing the character code in accordance with a predetermined character encoding scheme, for instance ASCII or UTF-8, using optical character recognition code. The comparison of the item image data with the mark data may then be carried out by determining, again using optical character recognition code, from the item image, a character code referring to a character of a character set or repertoire in accordance with the same character encoding scheme data and comparing the determined character code with the mark data set. Furthermore, the recognition of character codes may also be used to obtain values for controlling the processing of the documents from which the marks have been scanned, such as for determining how many or which inserts are to be added to a postal item.

It will be apparent to the skilled person, that within the framework of the invention as set forth in the claims, many other embodiments than the embodiments described above by way of examples are readily conceivable. For instance, instead of one or more scanners in the form of an array of light sensitive elements extending across a transport path, the scanner or scanners may also be provided in the form of one or more camera's each having a lens and a light sensitive matrix element, such as a CCD chip, arranged such that an image of a document or a portion of a document to be scanned is received by the light sensitive matrix element.

The invention claimed is:

1. A method for preparing mail pieces from printed postal items, the method comprising setting a control system of an apparatus for preparing mail pieces from the printed postal items during a setting stage and the control system subsequently controlling the apparatus during an operating stage during which the apparatus prepares the mail pieces from the printed postal items in accordance with settings established during the setting stage, the setting stage comprising:

feeding one or more printed postal items to a scanner of the apparatus;

the scanner of the apparatus scanning at least a portion of a printed postal item;

the scanner generating image data representing an image of the scanned portion of the printed postal item;

storing the image data representing an image of the scanned portion of the postal item in a memory of the control system;

displaying the image represented by the image data on a display;

selecting an area of the displayed image containing a selected mark;

a data processor of the control system generating, from the image data representing an image of the selected area of the displayed image, a selected mark data set representing at least the selected mark;

storing the selected mark data set in the memory;

inputting instruction data representing at least one mail preparation instruction in the control system; and storing the inputted instruction data in the memory in association with the selected mark data set; and the operating stage comprising:

feeding further printed postal items for inclusion in mail pieces to the scanner, at least one of the further printed postal items bearing a mark in agreement with the selected mark;

the scanner scanning at least a portion of each of the further printed postal items;

the scanner generating item image data representing an image of the scanned portion of each of said further printed postal items;

storing the item image data representing an image of the scanned portion of each of said further printed postal items in the memory of the control system;

for each of said further printed postal items, the data processor comparing the scanned stored item image data with the selected mark data set;

recognizing by the data processor that a mark represented by at least a portion of the stored item image data is in agreement with the selected mark represented by the selected mark data set, the data processor selecting the instruction data stored in association to the selected mark data set; and the apparatus preparing the mail piece from the scanned printed postal items under control of the control system in accordance with the selected instruction data.

2. A method according to claim 1, wherein the image data represent a pattern of at least brightnesses or colors.

3. A method according to claim 2, wherein the generation of the selected mark data set includes determining, from the image data, at least one character code referring to a character of a character set or repertoire in accordance with a predetermined character encoding scheme, the selected mark data set representing the character code, wherein the comparing of the stored item image data with the selected mark data set is carried out by determining, from the stored item image data, at least one character code of the mark represented by the stored item image data referring to a character of a character set or repertoire in accordance with a predetermined character encoding scheme data and comparing the determined at least one character code with the character code represented by the selected mark data set.

4. A method according to claim 1, wherein, during the setting stage, at least one further selected mark data set is generated and stored and further instruction data representing at least one further mail preparation instruction are inputted and stored in association with the at least one further selected mark data set; and wherein, during the operating stage, at least one of the further printed postal items fed bears a mark in agreement with the further selected mark;

the stored item image data are compared with said further selected mark data sets; and recognizing by the data processor that at least a portion of the stored item image data is in agreement with one of the selected marks represented by one of said selected mark data sets, the instruction data stored in association to the said one of said selected mark data sets are selected.

5. A method according to claim 1, wherein the selected mark data set further represents the position of the selected area.

6. An apparatus for preparing mail pieces from printed postal items, comprising at least one station for processing printed postal items into a mail piece, a scanner and a control system connected to the scanner and the at least one station; the control system comprising a memory and a data processor and being arranged for operating in a setting mode and in an operating mode during which the apparatus prepares mail pieces from printed postal items in accordance with settings established during the setting mode, operation in the setting mode comprising:

causing the scanner of the apparatus to scan at least a portion of a printed postal item and to generate image data representing an image of the scanned portion of the printed postal item;

storing the image data from the scanner in the memory of the control system;

causing the image represented by the image data to be displayed on a display;

storing a user input selecting an area of the displayed image containing a selected mark;

generating, from image data representing an image of the selected area of the displayed image, a selected mark data set representing at least the selected mark;

storing the selected mark data set; and storing user inputted instruction data representing at least one mail preparation instruction in association with the selected mark data set; and operation in the operating mode comprising:

causing further printed postal items for inclusion in mail pieces to be fed to the scanner, at least one of the further printed postal items bearing a mark in agreement with the selected mark;

causing the scanner to scan at least a portion of each of the further printed postal items and generating item image data representing an image of the scanned portion of each of said further printed postal items;

for each of said further printed postal items, comparing the stored item image data with the selected mark data set;

causing that the data processor recognizes that a mark represented by at least a portion of the stored item image data is in agreement with the selected mark represented by the selected mark data set, and selects the instruction data stored in association to the mark data set; and causing the apparatus to prepare the mail piece from the scanned printed postal item in accordance with the selected instruction data.

* * * * *